United States Patent
Arashi et al.

(10) Patent No.: US 8,183,171 B2
(45) Date of Patent: May 22, 2012

(54) DIELECTRIC CERAMIC COMPOSITION

(75) Inventors: Tomohiro Arashi, Tokyo (JP); Hisashi Kobuke, Tokyo (JP); Toshio Sakurai, Tokyo (JP)

(73) Assignee: TDK Corporation, Tokyo (JP)

( * ) Notice: Subject to any disclaimer, the term of this patent is extended or adjusted under 35 U.S.C. 154(b) by 118 days.

(21) Appl. No.: 12/659,931

(22) Filed: Mar. 25, 2010

(65) Prior Publication Data

US 2010/0248927 A1   Sep. 30, 2010

(30) Foreign Application Priority Data

Mar. 30, 2009  (JP) .................................. 2009-82029

(51) Int. Cl.
*C04B 35/468* (2006.01)
(52) U.S. Cl. ........................................................ 501/139
(58) Field of Classification Search ................... 501/139
See application file for complete search history.

(56) References Cited

U.S. PATENT DOCUMENTS

| | | | | |
|---|---|---|---|---|
| 6,458,734 B1 * | 10/2002 | Sugimoto et al. | ............. | 501/139 |
| 6,602,616 B2 * | 8/2003 | Sugimoto et al. | ............. | 428/688 |
| 7,517,823 B2 * | 4/2009 | Arashi et al. | ................... | 501/138 |
| 7,655,588 B2 * | 2/2010 | Arashi et al. | ................... | 501/139 |
| 2007/0213202 A1 * | 9/2007 | Arashi et al. | ................... | 501/138 |
| 2010/0244987 A1 * | 9/2010 | Sakurai et al. | ................ | 333/185 |

FOREIGN PATENT DOCUMENTS

| | | |
|---|---|---|
| EP | 1 860 080 A1 | 11/2007 |
| EP | 2 234 128 A1 | 9/2010 |
| JP | A-2006-124270 | 5/2006 |
| JP | B2-3940419 | 7/2007 |
| JP | B2-3940424 | 7/2007 |

OTHER PUBLICATIONS

European Search Report dated Jul. 6, 2010 in corresponding European Application No. 10 158 094.2.
Aug. 24, 2011 Office Action issued in European Patent Application No. 10 158 094.2.

* cited by examiner

*Primary Examiner* — Karl Group
(74) *Attorney, Agent, or Firm* — Oliff & Berridge, PLC

(57) ABSTRACT

To provide a dielectric ceramic composition which is free from variation in breakdown voltage, and has excellent electric properties. The dielectric ceramic composition according to the present invention includes: as a main component, a component represented by a composition formula $\{\alpha(xBaO-yNd_2O_3-zTiO_2)+\beta(2MgO-SiO_2)\}$, wherein x, y, and z representing a molar ratio of the BaO $Nd_2O_3$, and $TiO_2$ are each in a specific molar ratio range, and $\alpha$ and $\beta$ representing a volume ratio of each component, zinc oxide, boron oxide, a glass having a softening point at a specific temperature or less, and silver, wherein a, b, c, and d representing a mass ratio of each of the minor components based on the main component are each in a specific mass ration range.

14 Claims, 3 Drawing Sheets

DIELECTRIC CERAMIC COMPOSITION

CROSS-REFERENCES TO RELATED APPLICATIONS

The present application relates to and claims priority from Japanese Patent Application No. 2009-082029, filed on Mar. 30, 2009, the entire disclosure of which is incorporated herein by reference.

BACKGROUND OF THE INVENTION

1. Field of the Invention

The present invention relates to a dielectric ceramic composition.

2. Description of the Related Art

Recently, a high-frequency band referred to as "quasi-microwaves" of about several hundred MHz to several GHz is used for mobile phones and other such mobile communication devices whose demand is increasing. Thus, there is demand for devices having high-frequency properties as an electronic device, such as a filter, resonator, capacitor and the like, which is used in mobile communication devices. Further, with the decreasing size of recent mobile communication devices, there is also a need to reduce the size of high-frequency devices.

To contribute to the reduction in size of such high-frequency devices, surface mount devices (SMDs), which internally have a conductor such as an electrode, wires and the like (hereinafter, a conductor such as an electrode, wires and the like included in the interior of a high-frequency device is referred to as an "internal conductor") have become mainstream.

Further, to lower the cost of the devices, it is desirable to use as the internal conductor a conductor which has a low-resistance and is inexpensive, such as Ag. Various conductor compositions have been proposed for dielectric ceramic compositions having low-temperature sintering properties which allows Ag to be used as an internal conductor. For example, materials having a BaO-rare earth oxide-$TiO_2$-based compound as a main component have a high relative permittivity ($\in r$), a large Q value, and small resonant frequency temperature coefficient ($\tau f$). Thus, such materials are being a widely researched.

For example, research is being conducted into a technology to produce a device with improved properties by simultaneously firing the above-described dielectric ceramic having a high relative permittivity and a dielectric ceramic having a lower relative permittivity, which has different material qualities.

For example, Japanese Patent No. 3940424 (JP3940424B), Japanese Patent No. 3940419 (JP3940419B), and Japanese Unexamined Patent Application Publication No. 2006-124270 (JP2006-124270A) describe dielectric ceramic compositions having a BaO-rare earth oxide-$TiO_2$-based having low-temperature sintering properties as a main component so as to enable Ag or an alloy having Ag as a main component to be used as an internal conductor.

SUMMARY OF THE INVENTION

However, if the above-described dielectric ceramic composition having a BaO-rare earth oxide-$TiO_2$-based compound as a main component is used to form an electronic device such as a capacitor, variation in the breakdown voltage can occur due to segregation of the conductive particles such as Ag. If the variation in the breakdown voltage increases too much, the life of the electronic device such as a capacitor can be shortened as compared with the design specification, for example. According to the present inventors' knowledge, among electronic devices, this tendency is especially pronounced for thin-layer capacitors.

Accordingly, the present invention has been made in view of the above circumstances. It is an object of the present invention to provide a dielectric ceramic composition which can suppress variation in the breakdown voltage, and has excellent electric properties.

As a result of extensive research into the above-described situation, the present inventors discovered that a dielectric ceramic composition including: as a main component, a component represented by a composition formula $\{\alpha(xBaO.yNd_2O_3.zTiO_2)+\beta(2MgO.SiO_2)\}$, wherein x, y, and z representing a molar ratio of BaO, $Nd_2O_3$, and $TiO_2$ are each in a specific range, and $\alpha$ and $\beta$ representing a volume ratio of each component ($xBaO.yNd_2O_3.zTiO_2$ and $2MgO.SiO_2$) in the main component are each in a specific range; and as minor components with respect to the main component, zinc oxide, boron oxide, a glass having a softening point at a specific temperature or less, and silver, wherein when these minor components are represented as aZnO, $bB_2O_3$, cglass, and dAg, respectively, a, b, c, and d representing a mass ratio of each of the minor components on the main component are each in a specific range, is free from variation in breakdown voltage, and has excellent electric properties, thereby completing the present invention.

More specifically, the dielectric ceramic composition according to the present invention may include: as a main component, a component represented by a composition formula $\{\alpha(xBaO.yNd_2O_3.zTiO_2)+\beta(2MgO.SiO_2)\}$, wherein x, y, and z representing a molar ratio of BaO, $Nd_2O_3$, and $TiO_2$ are in the ranges:

14 (mol %)$\leq$x$\leq$19 (mol %),
12 (mol %)$\leq$y$\leq$17 (mol %), and
65 (mol %)$\leq$z$\leq$71 (mol %), respectively, and satisfy the relationship x+y+z=100, and $\alpha$ and $\beta$ representing a volume ratio of each component in the main component are in the ranges:

35 (vol %)$\leq\alpha\leq$65 (vol %) and
35 (vol %)$\leq\beta\leq$65 (vol %), respectively, and satisfy the relationship $\alpha+\beta$=100 (vol %); and as minor components with respect to the main component, zinc oxide, boron oxide, a glass having a softening point of 570° C. or less, and silver, wherein when these minor components are represented as aZnO, $bB_2O_3$, cglass, and dAg, respectively, a, b, c, and d representing a mass ratio of each of the minor components on the main component are in the ranges:

0.5 (mass %)$\leq$a$\leq$12.0 (mass %),
0.5 (mass %)$\leq$b$\leq$6.0 (mass %),
0.1 (mass %)$\leq$c<10.0 (mass %), and
0.1 (mass %)$\leq$d$\leq$3.0 (mass %), respectively.

According to the above, the dielectric ceramic composition can be fired at a lower temperature than the melting point of an Ag-based metal, is free from variation in breakdown voltage, and has excellent electric properties.

The "dielectric ceramic composition" is a raw material composition for a dielectric ceramic. The dielectric ceramic composition is sintered to obtain a sintered body (dielectric ceramic). Further, "sintering" is a phenomenon in which the dielectric ceramic composition forms a dense body, called a "sintered body", when heat is applied to the dielectric ceramic composition. Typically, compared with a pre-heating dielectric ceramic composition, the density, mechanical strength and the like of the sintered body are substantially increased. Further, the "sintering temperature" is the temperature of the dielectric ceramic composition when the dielectric ceramic composition is sintered. In addition, "firing" refers to a heat treatment carried out for the purpose of sintering, and "firing temperature" is the temperature of the atmosphere to which the dielectric ceramic composition is exposed during the heat treatment.

Further, in the present invention, it is preferred to further include a bismuth oxide as a minor component, wherein when a mass ratio of the bismuth oxide based on the main component is represented as $eBi_2O_3$, $e \leq 6.0$ (mass %).

In addition, in the present invention, it is preferred to further include a cobalt oxide as a minor component, wherein when a mass ratio of the cobalt oxide based on the main component is represented as $fCoO$, $f \leq 6.0$ (mass %).

Further, in the present invention, it is preferred to further include a manganese oxide as a minor component, wherein when a mass ratio of the manganese oxide based on the main component is represented as $gMnO_2$, $g \leq 3.0$ (mass %).

In addition, in the present invention, it is preferred to further include an alkaline earth metal oxide as a minor component. As the alkaline earth metal oxide, CaO, SrO, and BaO are preferred. When a mass ratio of the alkaline earth metal oxide based on the main component is represented as hRO, when Ca is used as an alkaline earth metal R, h is more than 0 (mass %) to 1.5 (mass %) or less in terms of CaO, when Ba is used as the alkaline earth metal R, h is more than 0 (mass %) to 3.5 (mass %) or less in terms of BaO, and when Sr is used as the alkaline earth metal R, h is more than 0 (mass %) to 2.5 (mass %) or less in terms of SrO.

In the present invention, the glass preferably includes lithium oxide.

The dielectric ceramic composition according to the present invention preferably has a Q value of 1,000 or more.

DESCRIPTION OF THE PREFERRED EMBODIMENT

Figure 1:
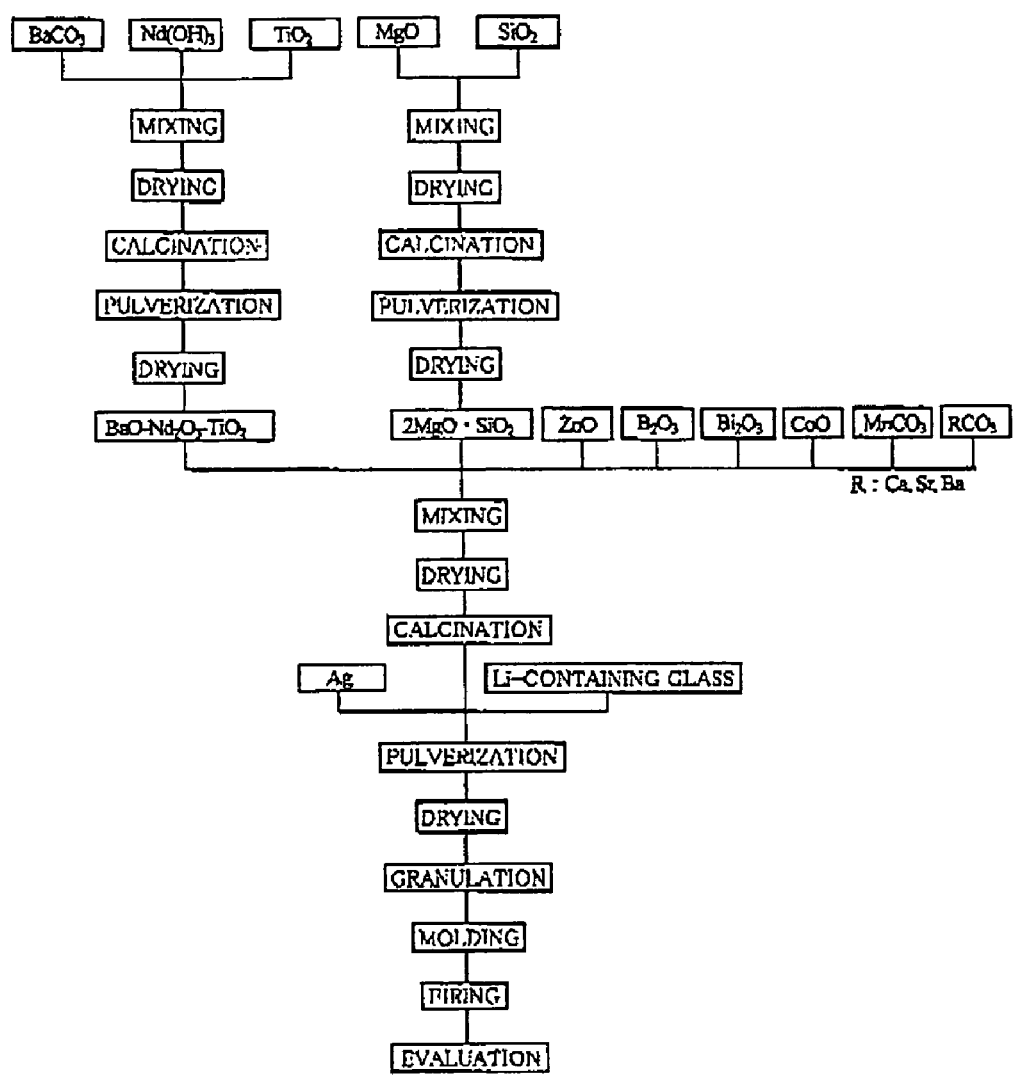
FIG. 1 is a flowchart illustrating one mode of a method for producing a dielectric ceramic composition according to an embodiment of the present invention.

An embodiment for carrying out the present invention (hereinafter, referred to simply as "present embodiment") will now be described in more detail. The following present embodiment is an illustrative example for describing the present invention, and does not limit the present invention to what is described below. The present invention may be carried out with various appropriate modifications made within the scope of the invention.

The dielectric ceramic composition of the present embodiment may include a main component represented by a composition formula $\{\alpha(xBaO.yNd_2O_3.zTiO_2)+\beta(2MgO.SiO_2)\}$.

The dielectric ceramic composition of the present embodiment further may include, as minor components with respect to the main component, zinc oxide, boron oxide, a glass having a softening point of 570° C. or less, and silver.

Main Component

The dielectric ceramic composition of the present embodiment may include, as a main component, a component represented by the composition formula $\{\alpha(xBaO.yNd_2O_3.zTiO_2)+\beta(2MgO.SiO_2)\}$, in which x, y, and z in the composition formula representing the molar ratio of the BaO, $Nd_2O_3$, and $TiO_2$ are in the ranges:

14 (mol %)$\leq x \leq$19 (mol %),
12 (mol %)$\leq y \leq$17 (mol %), and
65 (mol %)$\leq z \leq$71 (mol %), respectively,
and satisfy the relationship x+y+z=100.

Further, α and β representing the volume ratio (vol %) of each component in the main component are in the ranges:

35 (vol %)$\leq \alpha \leq$65 (vol %) and
35 (vol %)$\leq \beta \leq$65 (vol %), respectively,
and satisfy the relationship of α+β=100 (vol %).

Here, the content ratio of x in the BaO is 14 (mol %)$\leq x \leq$19 (mol %), preferably 15 (mol %)$\leq x \leq$19 (mol %), and more preferably 17 (mol %)$\leq x \leq$19 (mol %).

If the content ratio of x in the BaO is less than 14 mol %, the dielectric loss tends to increase, the Q value tends to decrease, and the power loss when used for a high frequency device becomes excessively large. Further, if the content ratio of x in the BaO is more than 19 mol %, the low-temperature sintering properties tend to deteriorate, which makes it more difficult to form the dielectric ceramic composition. Further, the Q value substantially decreases, so that the power loss when used for a high frequency device becomes excessively large.

Here, the content ratio of y in the $Nd_2O_3$ is 12 (mol %)$\leq y \leq$17 (mol %), preferably 13 (mol %)$\leq y \leq$16 (mol %), and more preferably 14 (mol %)$\leq y \leq$16 (mol %).

If the content ratio of y in the $Nd_2O_3$ is less than 12 mol %, the dielectric loss tends to increase, the Q value tends to decrease, and the power loss when used for a high frequency device becomes excessively large. Further, if the content ratio of y in the $Nd_2O_3$ is more than 17 mol %, the low-temperature sintering properties tend to deteriorate, which makes it more difficult to form the dielectric ceramic composition. Further, the Q value substantially decreases, so that the power loss when used for a high frequency device becomes excessively large.

Here, the content ratio of z in the $TiO_2$ is 65 (mol %)$\leq z \leq$71 (mol %), preferably 65 (mol %)$\leq z \leq$69 (mol %), and more preferably 65 (mol %)$\leq z \leq$67 (mol %).

If the content ratio of z in the $TiO_2$ is less than 65 mol %, the dielectric loss tends to increase, the Q value tends to decrease, and the resonant frequency temperature coefficient τf also tends to increase in the negative direction. Therefore, the power loss of a high frequency device increases, and the resonant frequency of the high frequency device tends to fluctuate based on the temperature. Further, if the content ratio of z in the $TiO_2$ is more than 71 mol %, the low-temperature sintering properties tend to deteriorate, which makes it more difficult to form the dielectric ceramic composition.

Further, in the above-described composition formula of the main component according to the present embodiment, α and β represent the volume ratios of (1) BaO, $Nd_2O_3$, and $TiO_2$ and (2) MgO and $SiO_2$, respectively, which serve as the main component of the dielectric ceramic composition of the present embodiment.

In the above-described composition formula, α and β are in the ranges:

35 (vol %)$\leq \alpha \leq$65 (vol %) and
35 (vol %)$\leq \beta \leq$65 (vol %), respectively
and satisfy the relationship of α+β=100.

The volume ratio α of the xBaO.yNd$_2$O$_3$.zTiO$_2$ component is preferably 45 (vol %)≦α≦65 (vol %), and more preferably 50 (vol %)≦α≦60 (vol %).

The volume ratio β of the 2MgO.SiO$_2$ component is preferably 35 (vol %)≦β≦55 (vol %), and more preferably 40 (vol %)≦β≦50 (vol %).

If α is more than 65 and β is less than 35, the relative permittivity ∈r of the dielectric ceramic composition tends to increase, and it becomes more difficult to improve the characteristics of a multilayer device joined to a conventional high-permittivity material. Further, if α is more than 65 and β is less than 35, τf tends to increase in the positive direction, and the resonant frequency of the high frequency device tends to fluctuate based on the temperature. On the other hand, if α is less than 35 and β is more than 65, the τf of the dielectric ceramic composition tends to increase in the negative direction, and the resonant frequency of the high frequency device tends to fluctuate based on the temperature. Therefore, the tendency of these drawbacks to occur can be suppressed by setting the volume ratio α of the xBaO.yNd$_2$O$_3$.zTiO$_2$ component and the volume ratio β of the 2MgO.SiO$_2$ component in the above-described preferred ranges.

From the perspective of reducing the dielectric loss, the 2MgO.SiO$_2$ included as a part of the main component is preferably included in the dielectric ceramic composition in the form of forsterite crystals. Whether forsterite crystals are included in the dielectric ceramic composition can be confirmed by an X-ray diffraction apparatus (XRD).

The BaO—Nd$_2$O$_3$—TiO$_2$-based compound has a high relative permittivity ∈r of about from 55 to 105. On the other hand, the 2MgO.SiO$_2$ (forsterite) has by itself a low relative permittivity ∈r of about 6.8. As a result of including a BaO—Nd$_2$O$_3$—TiO$_2$-based compound having a high relative permittivity ∈r and 2MgO.SiO$_2$ having a low relative permittivity ∈r, the dielectric ceramic composition of the present embodiment can suitably reduce the relative permittivity ∈r.

When a dielectric layer formed from the dielectric ceramic composition of the present embodiment is joined to a dielectric layer formed from a conventional BaO-rare earth oxide-TiO$_2$-based dielectric ceramic composition (high-permittivity material) to form a multilayer device, the lower the relative permittivity of the dielectric ceramic composition of the present embodiment is than the relative permittivity of the high-permittivity material, the better the properties of the multilayer device become. For this reason, the relative permittivity ∈r of the dielectric ceramic composition of the present embodiment is preferably 40 or less, more preferably 35 or less, and still more preferably from 25 to 35.

The BaO—Nd$_2$O$_3$—TiO$_2$-based compound often has a positive resonant frequency temperature coefficient τf (unit: ppm/K). On the other hand, the 2MgO.SiO$_2$ (forsterite) by itself often has a negative resonant frequency temperature coefficient τf, with a value of about −65 (ppm/K). In the present exemplary embodiment, by including a BaO—Nd$_2$O$_3$—TiO$_2$-based compound having a positive resonant frequency temperature coefficient τf and 2MgO.SiO$_2$ having a negative resonant frequency temperature coefficient τf in the dielectric ceramic composition as a main component, the positive τf and the negative τf cancel each other out, so that the resonant frequency temperature coefficient τf of the dielectric ceramic composition can be set close to zero. In addition, by increasing and decreasing the content of the 2MgO.SiO$_2$ in the main component, the resonant frequency temperature coefficient τf of the dielectric ceramic composition can be adjusted. Here, the temperature coefficient τf and the below-described Q value are values exhibited by the sintered dielectric ceramic composition, specifically, values exhibited by the dielectric ceramic.

The resonant frequency temperature coefficient τf (unit: ppm/K) of the dielectric ceramic composition can be calculated based on the relationship represent by the following formula (I).

$$\tau f = [f_T - f_{ref}/f_{ref}(T - T_{ref})] \times 10^6 \text{ (ppm/K)} \quad (1)$$

In the formula, $f_T$ represents the resonant frequency (kHz) at a temperature T, and $f_{ref}$ represents the resonant frequency (kHz) at a reference temperature $T_{ref}$. The magnitude of the absolute value of τf indicates the size of the amount of change in the resonant frequency of the dielectric ceramic composition as a function of temperature. For a high-frequency device such as a capacitor, dielectric filter and the like, since the change in resonant frequency due to temperature needs to be reduced, the absolute value of the dielectric ceramic composition τf needs to be reduced.

The τf of the dielectric ceramic composition according to the present embodiment is preferably from −40 (ppm/K) to +40 (ppm/K), more preferably from −30 (ppm/K) to +30 (ppm/K), and still more preferably from −20 (ppm/K) to +20 (ppm/K). By making the τf a value in the above-described preferred range, when utilizing the dielectric ceramic composition in a dielectric resonator, the change in the resonant frequency of the dielectric resonator with temperature can be reduced, and the properties of the dielectric resonator can be improved.

Further, a Q·f value of the BaO—Nd$_2$O$_3$—TiO$_2$-based compound is about from 2,000 GHz to 8,000 GHz. On the other hand, the Q·f value of the 2MgO.SiO$_2$ (forsterite) itself is about 200,000 GHz, and the dielectric loss of the 2MgO.SiO$_2$ is smaller than the dielectric loss of the BaO—Nd$_2$O$_3$—TiO$_2$-based compound. In the present embodiment, by including a BaO—Nd$_2$O$_3$—TiO$_2$-based compound and forsterite, which has a smaller dielectric loss than the BaO—Nd$_2$O$_3$—TiO$_2$-based compound, as the main component of the dielectric ceramic composition, a dielectric ceramic composition having a small dielectric loss can be obtained.

The "Q value" of the dielectric ceramic composition represents the magnitude of dielectric loss. The Q value is the inverse of the tangent tan δ (Q=1/tan δ) of the loss angle δ, which is the difference between the phase difference of the actual current and voltage and the phase difference 90° of the ideal current and voltage.

If an alternating current is applied to an ideal dielectric ceramic, the voltage and the current have a 90° phase difference. However, if the frequency of the alternating current is increased to a high frequency, the actual voltage and current have a phase which is not 90°. This can occur because of a phase lag (phase difference) of the electric flux density with respect to the electric field as a result of the electric polarization of the dielectric ceramic or the orientation of the polar molecules being unable to keep up with the changes in the high-frequency electric field, or as a result of conduction of the electrons or ions. Due to such a phase difference, a part of the high-frequency energy is turned into radiant heat. This phenomenon is called "dielectric loss". If dielectric loss decreases, the Q value increases, and if dielectric loss increases, the Q value decreases. Dielectric loss refers to the loss of power in a high-frequency device. To realize better properties in a high-frequency device, the dielectric loss needs to be small. Thus, a dielectric ceramic composition having a large Q value is required.

From the above perspectives, the Q value of the dielectric ceramic composition according to the present embodiment is preferably 1,000 or more.

Minor Components

The dielectric ceramic composition according to the present embodiment may include, as minor components with respect to the main component (the $BaO$—$Nd_2O_3$—$TiO_2$-based compound and $2MgO.SiO_2$), zinc oxide, boron oxide, a glass having a softening point of 570° C. or less, and silver. When these minor components are represented as $aZnO$, $bB_2O_3$, $cglass$, and $dAg$, respectively, a, b, c, and d representing the mass ratio of these minor components based on the main component satisfy the following relationships:

0.5 (mass %)$\leq a \leq$12.0 (mass %),
0.5 (mass %)$\leq b \leq$6.0 (mass %),
0.1 (mass %)$\leq c <$10.0 (mass %),
and
0.1 (mass %)$\leq d \leq$3.0 (mass %), respectively.

By including the above-described minor components in the dielectric ceramic composition, the sintering temperature of the dielectric ceramic composition is reduced. Consequently, the dielectric ceramic composition can be simultaneously fired with an Ag-based metal at a lower temperature than the melting point of a conductor material formed from an Ag-based metal.

Further, when the mass of the zinc oxide is represented as a value a (unit: mass %) in terms of ZnO, the content of the zinc oxide, which is one of the minor component species, based on 100 mass % of the main component is 0.5$\leq a \leq$12.0, preferably 1.0$\leq a \leq$9.0, and more preferably 3.0$\leq a \leq$7.0.

If α is less than 0.5, the low-temperature sintering effect (effect enabling sintering of the dielectric ceramic composition at a lower temperature) tends to be insufficient. On the other hand, if a is more than 12.0, the dielectric loss tends to increase and the Q value tends to decrease. Therefore, by setting the content a of the zinc oxide in the above-described preferred range, these tendencies can be suppressed. Specific examples of the zinc oxide may include ZnO and the like.

When the mass of the boron oxide is represented as a value b (unit: Mass %) in terms of $B_2O_3$, the content of the boron oxide, which is one of the minor component species, based on 100 mass % of the main component is 0.5$\leq b \leq$6.0, preferably 1.0$\leq b \leq$4.0, and more preferably 1.0$\leq b \leq$3.0.

If b is less than 0.5, the low-temperature sintering effect tends to be insufficient. On the other hand, if b is more than 6.0, the dielectric loss tends to increase and the Q value tends to decrease. Therefore, by setting the content b of the boron oxide in the above-described preferred range, these tendencies can be suppressed. Specific examples of the boron oxide may include $B_2O_3$ and the like.

The content c (unit: mass %) of the glass having a softening point of 570° C. or less, which is one of the minor component species, based on 100 mass % of the main component is 0.1$\leq c <$10.0, preferably 1.0$\leq c \leq$8.0, and more preferably 2.0$\leq c \leq$6.0.

If c is less than 0.1, the effect of suppressing Ag segregation in the dielectric ceramic decreases. On the other hand, if c is 10.0 or more, the problem of the sheet coating turning into a gel occurs. Therefore, by setting the content c of the glass having a low softening point in the above-described preferred range, these tendencies can be suppressed, and the Q value can be increased.

In the present embodiment, by including a glass, Ag segregation can be suppressed, which allows variation in the breakdown voltage to be suppressed. Consequently, reliability such as the voltage load life in a high-frequency device and the like can be improved, and a dielectric ceramic having stable capacitance and insulation resistance can be produced.

Further, by adding a glass, the sintering temperature of the dielectric ceramic composition can be substantially reduced, and the electric properties also can be improved. The dielectric ceramic composition according to the present embodiment can obtain a sufficient low-temperature sintering effect without using a copper oxide (described below), which is conventionally used as a minor component to enable low-temperature sintering.

The glass which can be used in the present embodiment is not especially limited, as long as it has a softening point of 570° C. or less. A known glass can be used. A glass composition formed from a mixture of, as raw materials, a modifying oxide component, a network-forming oxide component, a metal oxide and the like, may be used. Examples of a main modifying oxide component may include alkaline earth oxides. Specific examples may include at least one kind selected from CaO, SrO, and BaO. Examples of the network-forming oxide component may include $B_2O_3$ and $SiO_2$. Further, other than the main modifying oxide component, an arbitrary metal oxide may also be used as another modifying oxide component. Specific examples may include at least one kind selected from $Li_2O$, $Na_2O$, $K_2O$, $ZrO_2$, $Al_2O_3$, $ZnO$, $CuO$, $NiO$, $CoO$, $MnO$, $Cr_2O_3$, $V_2O_5$, $MgO$, $Nb_2O_5$, and $Ta_2O_5$. Among these, from the perspective of being able to effectively suppress Ag segregation, an alkali metal oxide is preferred, and $Li_2O$ is especially preferred.

The glass softening temperature in the present embodiment can be determined by differential thermal analysis (DTA).

The dielectric ceramic composition according to the present embodiment may further include silver as a minor component species. When represented as a value d (unit: mass) in terms of Ag, the content of the silver based on 100 mass % of the main component is 0.1$\leq d \leq$3.0, preferably 0.2$\leq d \leq$1.5, and more preferably 0.3$\leq d \leq$1.0.

If d is less than 0.1, the low-temperature sintering effect tends to be more difficult to obtain and the diffusion of Ag into the dielectric base material tends to be insufficiently suppressed. When the diffusion of Ag into the dielectric base material cannot be sufficiently suppressed, variation in the permittivity occurs due to the Ag content in the dielectric becoming nonuniform, gaps tend to form between the internal conductor and the dielectric base material due to the Ag content in the internal, conductor decreasing, and conduction defects tend to occur due to pulling of the internal conductor in a connection part for external connection. On the other hand, if d is more than 3.0, while the low-temperature sintering effect can be obtained, the dielectric loss tends to increase, and the Q value tends to decrease. Further, the amount of Ag diffused in the dielectric base material exceeds the allowable amount of Ag which can be contained in the dielectric. Consequently, the Ag tends to segregate in the dielectric body, and variation in the breakdown voltage tends to increase. As a result, reliability such as the voltage load life in a high-frequency device and the like tends to decrease. Therefore, by setting the content of the minor component Ag in the above-described preferred range, these tendencies can be suppressed.

In addition, by setting the content of the minor component Ag in the above-described preferred range, a dielectric ceramic can be obtained having a more pronounced low-temperature sintering effect for the dielectric ceramic composition, and stable capacitance and insulation resistance. Further, by including Ag as a minor component in the dielectric ceramic composition, when an Ag-based metal is used for an internal conductor, the diffusion of the Ag into the dielectric body from the internal conductor can be suppressed.

The dielectric ceramic composition according to the present embodiment preferably further includes bismuth oxide as a minor component. When the mass of the bismuth oxide is represented as a value e (unit: mass %) in terms of $Bi_2O_3$, the content of the bismuth oxide, which is one of the minor component species, based on 100 mass % of the main component is $e \leq 6.0$, preferably $0.5 \leq e \leq 5.0$, and more preferably $1.0 \leq e \leq 3.0$.

If e is more than 6.0, while the low-temperature sintering effect can be obtained, the Q value tends to decrease. Therefore, by setting the content e of the bismuth oxide in the above-described preferred range, a dielectric ceramic composition having a sufficient low-temperature sintering effect can be obtained. A specific preferred example of the used bismuth oxide is $Bi_2O_3$, for the reason that the above-described effect can be easily obtained.

The dielectric ceramic composition according to the present embodiment preferably further includes cobalt oxide as a minor component. When the mass of the cobalt oxide is represented as a value f (unit: mass %) in terms of CoO, the content of the cobalt oxide, which is one of the minor component species, based on 100 mass % of the main component is $f \leq 6.0$, preferably $0.1 \leq f \leq 3.0$, and more preferably $0.1 \leq f \leq 1.5$.

If f is more than 6.0, low-temperature sintering tends to be more difficult. Therefore, by setting the content f of the cobalt oxide in the above-described preferred range, a dielectric ceramic composition having a large Q vale can be obtained. A specific preferred example of the used cobalt oxide is CoO, for the reason that the above-described effect can be easily obtained.

The dielectric ceramic composition according to the present embodiment preferably further includes manganese oxide as a minor component. When the mass of the manganese oxide is represented as a value g (unit: mass %) in terms of $MnO_2$, the content of the manganese oxide, which is one of the minor component species, based on 100 mass % of the main component is $g \leq 3.0$, preferably $0.1 \leq g \leq 2.0$, and more preferably $0.3 \leq g \leq 1.0$.

If g is more than 3.0, the Q value tends to decrease. On the other hand, if g is less than 0.1, the low-temperature sintering effect tends to be insufficient. Therefore, by setting the content g of the manganese oxide in the above-described preferred range, these tendencies can be suppressed, and a dielectric ceramic composition having a sufficient low-temperature sintering effect can be obtained. A specific preferred example of the used manganese oxide is $MnO_2$, for the reason that the above-described effect can be easily obtained.

The dielectric ceramic composition according to the present embodiment preferably further includes an alkaline earth metal oxide as a minor component. When the mass of the alkaline earth metal oxide is represented as a value h (unit: mass) in terms of RO (R is an alkaline earth metal element), the content of the alkaline earth metal oxide, which is one of the minor component species, based on 100 mass % of the main component is preferably $h \leq 3.5$, more preferably $0.1 \leq h \leq 3.0$, and still more preferably $0.2 \leq h \leq 1.5$. By including an alkaline earth metal oxide in the dielectric ceramic composition, the low-temperature sintering effect for the dielectric ceramic composition is more pronounced.

If h is more than 3.5, while the low-temperature sintering effect is pronounced, the dielectric loss tends to increase and the Q value tends to decrease. Therefore, by setting the content h of the alkaline earth metal oxide in the above-described preferred range, these tendencies can be suppressed.

As the alkaline earth metal R, any of Ca, Ba, and Sr is more preferred, and Ca is still more preferred. Two kinds or more of these may be mixed for use. If Ca is used as the alkaline earth metal R, the content h of the alkaline earth metal oxide is preferably $0 \leq h \leq 1.5$ in terms of CaO. If Ba is used as the alkaline earth metal R, the content h of the alkaline earth metal oxide is preferably $0 \leq h \leq 3.5$ in terms of BaO. If Sr is used as the alkaline earth metal R, the content h of the alkaline earth metal oxide is preferably $0 \leq h \leq 2.5$ in terms of SrO. Specific examples of the alkaline earth metal oxide R may include CaO, BaO, and SrO. It is more preferred to use CaO as the alkaline earth metal oxide.

Although the dielectric ceramic composition according to the present embodiment can obtain a sufficient low-temperature sintering effect without using a copper oxide and the like, which is conventionally used as a minor component to enable low-temperature sintering, such a copper oxide may be used.

In the above-described present embodiment, since the main component of the dielectric ceramic composition may include a $BaO$—$Nd_2O_3$—$TiO_2$-based compound, it has similar material qualities as those of a conventional BaO-rare earth oxide-$TiO_2$-based dielectric ceramic composition (high-permittivity material). Therefore, the contraction behavior and linear expansion coefficient during firing of the dielectric ceramic composition according to the present embodiment are equivalent to that of a high-permittivity material. Thus, by joining the dielectric ceramic composition of the present embodiment and a high-permittivity material and firing the joined product to produce a multilayer device, defects do not easily occur on the joining face, the appearance of the device is good, and a multilayer device having high properties can be obtained.

Production Method

An example of a method for producing the dielectric ceramic composition according to the present embodiment will now be described. FIG. 1 is a flowchart illustrating an example of a method for producing the dielectric ceramic composition according to the present embodiment.

Examples of the respective raw materials for the main component and the minor components of the dielectric ceramic composition which can be used may include a $BaO$—$Nd_2O_3$—$TiO_2$-based compound, $2MgO.SiO_2$, zinc oxide, boron oxide, bismuth oxide, cobalt oxide, manganese carbonate, and an alkaline earth metal carbonate, or compounds which can turn into these oxides by firing (heat treatment such as the below-described calcination).

Examples of compounds which can turn into the above-described oxides by firing may include carbonates, nitrates, oxalates, hydroxides, sulfides, organic metal compounds, and the like.

Main Component

First, a predetermined amount of each of barium carbonate, neodymium hydroxide, and titanium oxide as the main component raw materials are weighed and mixed. At this stage, each of the raw materials is weighed so that the molar ratios x, y, and z in the composition formula $xBaO.yNd_2O_3.zTiO_2$ are in the above-described preferred range.

The mixing of the barium carbonate, neodymium hydroxide, and titanium oxide can be carried out by a mixing method such as dry mixing, wet mixing and the like. For example, the mixing can be carried out using pure water, ethanol and the like, with a ball mill. The mixing time may be about, for example, from 4 hours to 24 hours.

The mixture of the barium carbonate, neodymium hydroxide, and titanium oxide is dried at a temperature of preferably from 100° C. to 200° C., and more preferably from 120° C. to 140° C., for about from 12 hours to 36 hours, and then calcined. As a result of the calcination, a $BaO$—$Nd_2O_3$—$TiO_2$-based compound is produced. The calcination temperature is preferably from 1,100° C. to 1,500° C., and more preferably from 1,100° C. to 1,350° C. The calcination is preferably carried out for about from 1 hours to 24 hours.

The produced BaO—Nd$_2$O$_3$—TiO$_2$-based compound is pulverized to form a powder. This powder is then dried to obtain a powder of the BaO—Nd$_2$O$_3$—TiO$_2$-based compound. The pulverization can be carried out by a pulverization method such as dry pulverization or wet pulverization. For example, the pulverization can be carried out using pure water, ethanol, and the like, with a ball mill. The pulverization time may be about, for example, from 4 hours to 24 hours. The drying of the powder may be carried out at a temperature of preferably from 100° C. to 200° C., and more preferably from 120° C. to 140° C., for about from 12 hours to 36 hours.

Next, predetermined amounts of magnesium oxide and silicon oxide, which are the raw materials for the other main component 2MgO.SiO$_2$ (forsterite), are weighed and mixed, and the resultant mixture is calcined. The mixing of the magnesium oxide and the silicon oxide can be carried out by a mixing method such as dry mixing, wet mixing, and the like. For example, the mixing can be carried out using pure water, ethanol and the like, with a ball mill. The mixing time may be about from 4 hours to 24 hours.

The mixture of the magnesium oxide and the silicon oxide is dried at a temperature of preferably from 100° C. to 200° C., and more preferably from 120° C. to 140° C., for about from 12 hours to 36 hours, and then calcined. As a result of the calcination, 2MgO.SiO$_2$ (forsterite) is produced. The calcination temperature is preferably from 1,100° C. to 1,500° C., and more preferably from 1,100° C. to 1,350° C. The calcination is preferably carried out for about from 1 hour to 24 hours.

The produced forsterite crystals are pulverized to form a powder. This powder is then dried to obtain a powder of forsterite crystals. The pulverization can be carried out by a pulverization method such as dry pulverization or wet pulverization. For example, the pulverization can be carried out using pure water, ethanol, and the like, with a ball mill. The pulverization time may be about, for example, from 4 hours to 24 hours. The drying of the powder may be carried out at a temperature of preferably from 100° C. to 200° C., and more preferably from 120° C. to 140° C., for about from 12 hours to 36 hours.

Alternatively, rather than producing forsterite crystals from a raw material containing magnesium and a raw material containing silicon as described above, a commercially-available forsterite may also be used. For example, commercially-available forsterite may be pulverized and dried by the above-described method to obtain a forsterite powder.

Next, the main component of the dielectric ceramic composition is obtained by mixing the obtained BaO—Nd$_2$O$_3$—TiO$_2$-based compound powder and the 2MgO.SiO$_2$ (forsterite crystals) powder in the above-described volume ratio $\alpha:\beta$. Thus, by mixing the BaO—Nd$_2$O$_3$—TiO$_2$-based compound and 2MgO.SiO$_2$, compared with when using a BaO—Nd$_2$O$_3$—TiO$_2$-based compound by itself as a main component, the $\in$r of the dielectric ceramic composition can be reduced, the resonant frequency temperature coefficient can be set close to zero, and the dielectric loss can be reduced.

To increase the addition effect of the 2MgO.SiO$_2$, it is preferred to reduce unreacted raw material components included in the forsterite. Specifically, when preparing the mixture of magnesium oxide and silicon oxide, it is preferred to mix the magnesium oxide and the silicon oxide so that the number of moles of magnesium is twice the number of moles of silicon.

Minor Components

Next, a predetermined amount of the obtained main component powder of the dielectric ceramic composition and predetermined amounts of the zinc oxide, boron oxide, bismuth oxide, cobalt oxide, manganese carbonate, and alkaline earth metal carbonate, which are the raw materials for the minor components of the dielectric ceramic composition, are weighed and then mixed to form a raw material mixed powder.

The weighing of the respective minor component raw materials is carried out so that, based on the main component, the of each minor component in the completed dielectric ceramic composition is the mass ratio described above. The mixing can be carried out by a mixing method such as dry mixing, wet mixing and the like. For example, the mixing can be carried out using pure water, ethanol and the like, with a ball mill. The mixing time may be about from 4 hours to 24 hours.

The raw material mixed powder is dried at a temperature of preferably from 100° C. to 200° C., and more preferably from 120° C. to 140° C., for about from 12 hours to 36 hours.

The raw material mixed powder is calcined at a temperature at or less than the below-described firing temperature (from 860° C. to 1,000° C.), for example at from 700° C. to 800° C., for about from 1 hour to 10 hours. By thus calcining at a temperature at or less than the firing temperature, fusing of the forsterite in the raw material mixed powder can be suppressed. Consequently, the forsterite can be included in the dielectric ceramic composition in crystal form.

Thus, by carrying out calcination and pulverization a total of two times, at a point prior to mixing the respective raw materials, and at a point after the respective raw materials are mixed to form the raw material mixed powder, the dielectric ceramic composition main component and minor components can be uniformly mixed, so that a dielectric ceramic composition having uniform material qualities can be obtained.

Subsequently, during the pulverization of the calcined raw material mixed powder, the raw material containing Ag, which is one of the minor components, and the glass are added. Then, a drying treatment is carried out.

The addition of the raw material containing Ag is not limited to during pulverization. The addition may also be carried out during the mixing before calcination. Examples of the raw material containing Ag may include Ag in a metal state (hereinafter, sometimes referred to as "metal Ag"), and compounds which can turn into metal Ag by calcination. Examples of compounds which can turn into metal Ag by calcination may include silver nitrates, silver oxides, silver chlorides and the like.

Further, the addition of the glass is not limited to during pulverization. The addition may also be carried out during the mixing before calcination.

The pulverization can be carried out by a pulverization method such as dry pulverization or wet pulverization. For example, the pulverization can be carried out using pure water, ethanol, and the like, with a ball mill. The pulverization time may be about, for example, from 4 hours to 24 hours. The drying of the pulverized powder may be carried out at a temperature of preferably from 100° C. to 200° C., and more preferably from 120° C. to 140° C., for about from 12 hours to 36 hours.

An organic binder, such as a polyvinyl alcohol binder, an acrylic binder, and an ethyl cellulose binder, is mixed into the thus-obtained powder, and the resultant mixture is molded into a desired shape. The molded product is then fired and sintered. The molding method may be appropriately selected based on the desired shape. Examples of the molding method may include wet molding, such as a sheet method and a printing method, and dry molding, such as press molding. Further, the firing is preferably carried out in an oxygen atmosphere, such as air. The firing temperature is preferably equal to or less than the melting point of the conductor, such as Ag or an alloy having Ag as a main component, which can be used as an inner electrode. Specifically, the firing temperature is preferably from 8'00° C. to 950° C., more preferably from 850° C. to 920° C., and still more preferably from 860° C. to 900° C.

The dielectric ceramic composition according to the present embodiment can be preferably used, for example, as a raw material for a multilayer device, which is one kind of high-frequency device. A multilayer device is produced from a multilayer ceramic substrate formed from a plurality of ceramic layers in which a dielectric device, such as a capacitor, an inductor and the like, is integrally formed (integrally embedded). This multilayer ceramic substrate can be produced by forming a through hole in a green sheet which is formed from dielectric ceramic compositions having different dielectric properties from each other, then laminating a plurality of these green sheets, and simultaneously firing the green sheets.

In the production of the multilayer device, an organic binder, such as an acrylic binder, an ethyl cellulose binder or the like, is mixed into the dielectric ceramic composition of the present embodiment, and then the resultant mixture is molded into a sheet-form to obtain the green sheets. As the molding method for the green sheets, a wet molding method such as a sheet method is used.

Next, a plurality of the obtained green sheets and green sheets having different dielectric properties from the obtained green sheets are alternately laminated so that an Ag-based metal as a conductor material, which will serve as an inner electrode, is arranged between the green sheets. The resultant laminated body is cut to a desired dimension to form a green chip. The binder is removed from the obtained green chip, which is then fired to obtain a sintered body. The firing is preferably carried out, for example, in an oxygen atmosphere, such as air. The firing temperature is preferably equal to or less than the melting point of the Ag-based metal used as a conductor. Specifically, the firing temperature is preferably from 860° C. to 1,000° C., and more preferably from 870° C. to 940° C. An external electrode or the like is formed on the obtained sintered body to thereby produce a multilayer device including an inner electrode formed from an Ag-based metal.

EXAMPLES

The present invention will now be described in much greater detail based on the following examples. However, the present invention is not limited to these examples.

Examples 1 to 14

The dielectric ceramic compositions of Examples 1 to 14 were produced while varying the main component composition and the added amounts of minor components of the dielectric ceramic composition so that the main component composition and the content of minor components were as shown in Table 1. Then, measurement samples were produced using the obtained dielectric ceramic compositions. The dielectric properties (∈r, and Q value) of these measurement samples were measured. Further, the presence of Ag segregation was also observed. The results are collectively shown in Table 1. Other than varying the conditions as shown in Table 1, the production method of the dielectric ceramic compositions, the production method of the measurement samples, and the evaluation method were entirely the same as those for Example 1, which will be described below as an example. In the examples, the following two kinds of low-softening point glass were used. Glass A: $SiO_2$—BaO—CaO—$Li_2O$-based crystalline glass (softening point: 560° C., glass transition point: 480° C.) Glass B: ZnO—$B_2O_3$—$SiO_2$—$Al_2O_3$—$Na_2O$-based crystalline glass (softening point: 560° C., glass transition point: 460° C.)

Example 1

A dielectric ceramic composition including a main component containing a component represented by the composition formula $\{\alpha(xBaO.yNd_2O_3.zTiO_2)+\beta(2MgO.SiO_2)\}$, in which $\alpha$=55 (vol %), $\beta$=45 (vol %), x=18.5 (mol %), y=15.4 (mol %), and z=66.1 (mol %), and as minor components, based on 100 mass % of the main component, 6.67 mass % of ZnO, 2.48 mass % of $B_2O_3$, 5.0 mass % of glass A, 0.75 mass % of Ag, 1.00 mass % of CoO, 3.00 mass % of $Bi_2O_3$, 0.50 mass % of $MnCO_3$ in terms of $MnO_2$ by a calcination heat treatment, and 0.60 mass % of $CaCO_3$ in terms of CaO by a calcination heat treatment, was produced by the below-described procedures.

First, the main component raw materials $BaCO_3$, Nd$(OH)_3$, and $TiO_2$ were each weighed so that the molar ratios of x, y, and z in the $xBaO.yNd_2O_3.zTiO_2$ obtained after calcining the raw materials would have the values described above. Then, pure water was added to the weighed raw materials to prepare a slurry. This slurry was subjected to wet mixing with a ball mill, and then dried at 120° C. to obtain a powder. This powder was calcined at 1,200° C. for 4 hours in air to obtain a BaO—$Nd_2O_3$—$TiO_2$-based compound having a composition formula represented by $xBaO.yNd_2O_3.zTiO_2$ (x=18.5 (mol %), y=15.4 (mol %), and z=66.1 (mol %)). Pure water was added to this BaO—$Nd_2O_3$—$TiO_2$-based compound to prepare a slurry. The slurry was pulverized with a ball mill, and dried at 120° C. to produce a powder of the BaO—$Nd_2O_3$—$TiO_2$-based compound.

Next, MgO and $SiO_2$, which are the other raw materials of the main component, were each weighed so that the number of moles of magnesium atoms would be twice the number of moles of silicon atoms. Then, pure water was added to the weighed raw materials to prepare a slurry. This slurry was subjected to wet mixing with a ball mill, and then dried at 120° C. to obtain a powder. This powder was calcined at 1,200° C. for 3 hours in air to obtain forsterite crystals ($2MgO.SiO_2$). Pure water was added to these forsterite crystals to prepare a slurry. The slurry was pulverized with a ball mill, and dried at 120° C. to produce a powder of forsterite crystals.

Next, the obtained BaO—$Nd_2O_3$—$TiO_2$-based compound powder and the forsterite crystal powder were mixed in a volume ratio of 55:45. To the obtained mixture, the respective minor component raw materials ZnO, $B_2O_3$, CoO, $MnCO_3$, $CaCO_3$, and $Bi_2O_3$ were added. Pure water was added to the resultant mixture to prepare a slurry. This slurry was subjected to wet mixing with a ball mill, and then dried at 120° C. to obtain a raw material mixed powder. This raw material mixed powder was calcined at 750° C. for 2 hours in air to obtain a calcined powder. Metal Ag and the glass A, which are minor component of the dielectric ceramic composition, were then added to the obtained calcined powder. Next, ethanol was added to the calcined powder containing the metal Ag and glass A to prepare a slurry. The slurry was wet pulverized with a ball mill, and dried at 100° C. to obtain a powder of the dielectric ceramic composition of Example 1.

The respective added amounts of the ZnO, $B_2O_3$, CoO, $MnO_2$, CaO, $Bi_2O_3$, glass A, metal Ag in the mixture of the BaO—$Nd_2O_3$—$TiO_2$-based compound powder and the forsterite crystal powder were adjusted so that, based on 100 mass % of the main component, the completed dielectric ceramic composition would contain 6.67 mass % of ZnO, 2.48 mass % of $B_2O_3$, 5.0 Mass % of glass A, 0.75 mass % of metal Ag, 1.00 mass % of CoO, 3.00 mass % of $Bi_2O_3$, 0.50 mass % of $MnO_2$, and 0.60 mass % of CaO.

An acrylic resin binder, a dispersant, a plasticizer, and toluene as an organic solvent were added to the powder of the dielectric ceramic composition of Example 1, and the resultant mixture was mixed with a ball mill to produce a dielectric paste. Then, using this dielectric paste, a green sheet having a thickness of about 35 μm was formed on a PET film. A green substrate was produced by laminating and pressure-bonding a predetermined number of green sheets from which the PET film had been peeled off. The green substrate was fired for 2 hours at a firing temperature of 860° C., and then cut to a predetermined size (70 mm long×1.0 mm wide×1.0 mm thick) to obtain a sample for measuring dielectric properties.

Measurement of Dielectric Properties

The Q value and the relative permittivity $\in r$ representing the dielectric properties of the measurement sample of Example 1 were measured according to a method called a "cavity resonator perturbation method". The measurement results are collectively shown in Table 1. The measurement frequency was 2 GHz.

Presence of Ag Segregation

An inner polished surface of the obtained measurement sample was subjected to elemental (Ag) mapping by an EPMA (Electron Probe Micro Analyzer) to confirm the presence of Ag segregation.

breakdown voltage (DCVB) of these laminated ceramic capacitors was measured. The DCVB average value, standard deviation, and change coefficient (C.V.) of Examples 1 to 3 and Comparative Examples 1 to 3 were determined to test the variation in DCVB.

Laminated Ceramic Capacitor Production Method

An Ag electrode paste was printed on the above green sheets, and then these green sheets and outer layer green sheets (sheets on which an Ag paste was not printed) were laminated and pressure-bonded. The number of laminated sheets having an Ag electrode was 8, and the outer layer green sheets were arranged above and below each of the 8 sheets. Next, the laminated green sheets were cut to a predetermined size to obtain a green chip. The binder was removed from this green chip, and the chip was then fired for 2 hours at from 860° C. to 900° C. After firing, Ag was baked on as a terminal electrode. The resultant chip was then subjected to a Ni—Sn plating treatment to obtain a laminated ceramic capacitor.

DCVB Measurement

A voltage was applied to the laminated ceramic capacitor at a rate of voltage rise of 50 V/s, and the voltage value when the detection current was 10 mA was taken as the DCVB (unit: V).

Figure 2:
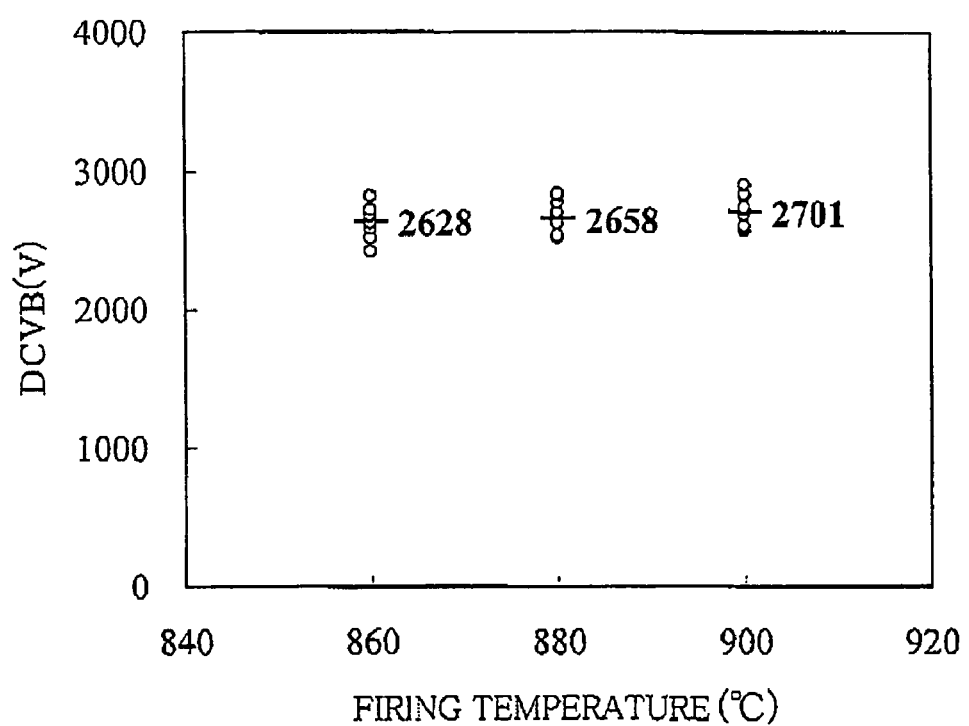
FIG. 2 is graph plotting a relationship between variation in the direct current breakdown voltage (DCVB) in Examples 1 to 3 and firing temperature.
Figure 3:
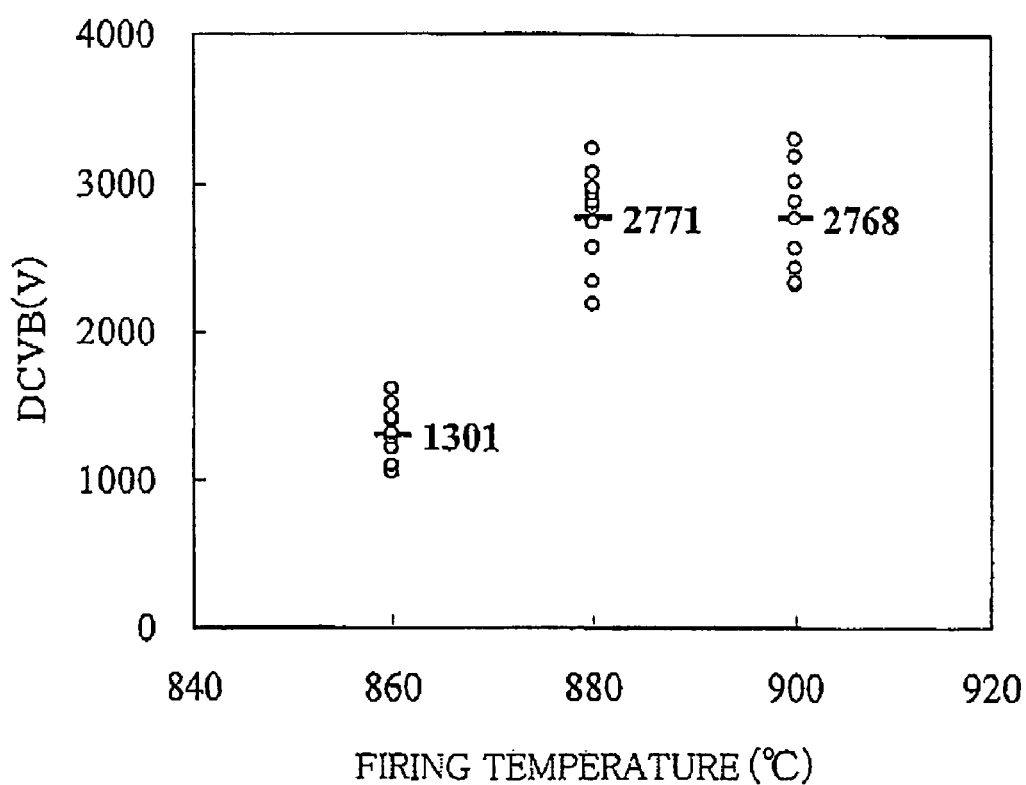
FIG. 3 is graph plotting a relationship between variation in the direct current breakdown voltage (DCVB) in Comparative Examples 1 to 3 and firing temperature.

The DCVB measurement value, average value, standard deviation, and change coefficient (C.V.) of Examples 1 to 3 and Comparative Examples 1 to 3 are shown in Tables 2 and 3. FIG. 2 shows the relationship between variation in the DCVB in Examples 1 to 3 and firing temperature. FIG. 3 shows the relationship between variation in the DCVB in Comparative Examples 1 to 3 and firing temperature.

TABLE 1

| | Main component composition | | | | | Minor component added amount (Mass % based on 100% of the main component) | | | | | | | | Firing temper- ature | Dielectric properties | | |
|---|---|---|---|---|---|---|---|---|---|---|---|---|---|---|---|---|---|
| | | | | | | a | b | Glass kind | Glass | c Ag | d CoO | e $Bi_2O_3$ | f $MnO_2$ | g | h | | Q | Ag |
| | α | β | x | y | z | ZnO | $B_2O_3$ | | | | | | | CaO | (° C.) | εr | (—) | segregation |
| Example | | | | | | | | | | | | | | | | | | |
| 1 | 55 | 45 | 18.5 | 15.4 | 66.1 | 6.67 | 2.48 | A | 5.0 | 0.75 | 1.00 | 3.00 | 0.50 | 0.60 | 860 | 30.9 | 1020 | No |
| 2 | | | | | | | | | | | | | | | 880 | 31.3 | 1160 | |
| 3 | | | | | | | | | | | | | | | 900 | 31.5 | 1180 | |
| 4 | | | | | | | | | | | | | | | 920 | 31.8 | 1210 | |
| 5 | 55 | 45 | 18.5 | 15.4 | 66.1 | 6.67 | 2.48 | A | 2.0 | 0.75 | 1.00 | 3.00 | 0.50 | 0.60 | 860 | 29.0 | 980 | No |
| 6 | | | | | | | | | | | | | | | 880 | 31.1 | 1050 | |
| 7 | | | | | | | | | | | | | | | 900 | 31.7 | 1070 | |
| 8 | | | | | | | | | | | | | | | 920 | 32.0 | 1090 | |
| 9 | 55 | 45 | 18.5 | 15.4 | 66.1 | 6.67 | 2.48 | A | 5.0 | 0.75 | 0.00 | 0.00 | 0.50 | 0.00 | 900 | 30.0 | 1540 | No |
| 10 | 55 | 45 | 18.5 | 15.4 | 66.1 | 3.34 | 1.24 | A | 5.0 | 0.75 | 1.00 | 0.00 | 0.50 | 0.00 | 900 | 31.7 | 1590 | No |
| 11 | 55 | 45 | 18.5 | 15.4 | 66.1 | 3.34 | 1.24 | A | 5.0 | 0.75 | 1.00 | 3.00 | 0.50 | 0.00 | 900 | 32.2 | 1410 | No |
| 12 | 55 | 45 | 18.5 | 15.4 | 66.1 | 4.50 | 1.70 | A | 5.0 | 0.75 | 1.00 | 1.50 | 0.50 | 0.00 | 900 | 31.6 | 1490 | No |
| 13 | 55 | 45 | 18.5 | 15.4 | 66.1 | 6.67 | 2.48 | B | 2.0 | 0.75 | 1.00 | 3.00 | 0.50 | 0.60 | 900 | 31.5 | 1020 | No |
| 14 | 55 | 45 | 18.5 | 15.4 | 66.1 | 6.67 | 2.48 | B | 5.0 | 0.75 | 1.00 | 3.00 | 0.50 | 0.60 | 900 | 31.5 | 1010 | No |
| Comparative Example | | | | | | | | | | | | | | | | | | |
| 1 | 55 | 45 | 18.5 | 15.4 | 66.1 | 6.67 | 2.48 | — | 0.00 | 0.75 | 1.00 | 3.00 | 0.50 | 0.60 | 860 | 26.5 | 770 | Yes |
| 2 | | | | | | | | | | | | | | | 880 | 29.8 | 910 | |
| 3 | | | | | | | | | | | | | | | 900 | 30.9 | 980 | |
| 4 | | | | | | | | | | | | | | | 920 | 31.3 | 970 | |
| 5 | 55 | 45 | 18.5 | 15.4 | 66.1 | 6.67 | 2.48 | A | 10.0 | 0.75 | 1.00 | 3.00 | 0.50 | 0.60 | Sheet coating gelled | | | |
| 6 | 55 | 45 | 18.5 | 15.4 | 66.1 | 6.67 | 2.48 | B | 10.0 | 0.75 | 1.00 | 3.00 | 0.50 | 0.60 | 900 | 30.0 | 690 | No |

Measurement of Variation in Direct Current Breakdown Voltage

The following laminated ceramic capacitors were produced from the respective measurement samples of Examples 1 to 3 and Comparative Examples 1 to 3, and the direct current According to Table 1, Examples 1 to 14 all showed no Ag segregation and good electrical properties. On the other hand, Comparative Examples 1 to 4 showed Ag segregation. Further, in Comparative Example 5, a capacitor could not be formed because the sheet coating gelled. In Comparative Example 6, although there was no Ag segregation, it was found that the electrical properties deteriorated.

TABLE 2

|  | Example 1 | Example 2 | Example 3 |
|---|---|---|---|
| Firing temperature (° C.) | 860 | 880 | 900 |
| No. 1 | 2,410 | 2,510 | 2,560 |
| No. 2 | 2,520 | 2,510 | 2,570 |
| No. 3 | 2,580 | 2,540 | 2,590 |
| No. 4 | 2,610 | 2,610 | 2,600 |
| No. 5 | 2,640 | 2,610 | 2,680 |
| No. 6 | 2,660 | 2,690 | 2,720 |
| No. 7 | 2,660 | 2,700 | 2,740 |
| No. 8 | 2,680 | 2,760 | 2,820 |
| No. 9 | 2,710 | 2,820 | 2,830 |
| No. 10 | 2,810 | 2,830 | 2,900 |
| Average value (V) | 2,628 | 2,658 | 2,701 |
| Standard deviation | 109 | 121 | 121 |
| C.V. (%) | 4.1% | 4.5% | 4.5% |

TABLE 3

|  | Comparative Example 1 | Comparative Example 2 | Comparative Example 3 |
|---|---|---|---|
| Firing temperature (° C.) | 860 | 880 | 900 |
| No. 1 | 1,050 | 2,180 | 2,310 |
| No. 2 | 1,100 | 2,330 | 2,340 |
| No. 3 | 1,100 | 2,560 | 2,430 |
| No. 4 | 1,210 | 2,730 | 2,560 |
| No. 5 | 1,290 | 2,840 | 2,760 |
| No. 6 | 1,320 | 2,870 | 2,880 |
| No. 7 | 1,400 | 2,930 | 2,890 |
| No. 8 | 1,410 | 2,960 | 3,020 |
| No. 9 | 1,510 | 3,070 | 3,190 |
| No. 10 | 1,620 | 3,240 | 3,300 |
| Average value (V) | 1,301 | 2,771 | 2,768 |
| Standard deviation | 188 | 329 | 350 |
| C.V. (%) | 14.5% | 11.9% | 12.6% |

According to Tables 2 and 3 and FIGS. 2 and 3, Examples 1 to 3 have a DCVB change coefficient (C.V.) of less than 5%. On the other hand, Comparative Examples 1 to 3 have a DCVB change coefficient (C.V.) of more than 10%. Further, the average DCVB of Comparative Example 1 was 1,301 V, thus confirming that sintering was insufficient. More specifically, it was shown that Examples 1 to 3, which showed no Ag segregation, had little variation in DCVB, while Comparative Examples 1 to 3, which showed Ag segregation, had a large variation in DCVB. Therefore, it can be understood that a dielectric ceramic composition with no Ag segregation can thoroughly reduce variation in DCVB. Thus, based on the present examples, it was shown that the dielectric ceramic composition according to the present invention has little variation in breakdown voltage and excellent electrical properties.

INDUSTRIAL APPLICABILITY

The above that the dielectric ceramic composition according to the present invention can be utilized in a wide range of fields as various electronic parts and the like.

According to the present invention a dielectric ceramic composition can be realized which is free from variation in breakdown voltage, and has excellent electric properties.

What is claimed is:

1. A dielectric ceramic composition comprising: as a main component, a component represented by a composition formula $\{\alpha(xBaO \cdot yNd_2O_3 \cdot zTiO_2) + \beta(2MgO \cdot SiO_2)\}$, wherein x, y, and z representing a molar ratio of BaO, $Nd_2O_3$, and $TiO_2$ are in the ranges:

14 (mol %) $\leq$ x $\leq$ 19 (mol %),
12 (mol %) $\leq$ y $\leq$ 17 (mol %), and
65 (mol %) $\leq$ z $\leq$ 71 (mol %), respectively, and satisfy the relationship x+y+z=100, and $\alpha$ and $\beta$ representing a volume ratio of each component in the main component are in the ranges:

35 (vol %) $\leq \alpha \leq$ 65 (vol %) and
35 (vol %) $\leq \beta \leq$ 65 (vol %), respectively, and satisfy the relationship $\alpha+\beta$=100 (vol %); and as minor components with respect to the main component, zinc oxide, boron oxide, a glass having a softening point of 570° C. or less, and silver, wherein when these minor components are represented as aZnO, $bB_2O_3$, cglass, and dAg, respectively, a, b, c and d representing a mass ratio of each of the minor components based on the main component are in the ranges:

0.5 (mass %) $\leq$ a $\leq$ 12.0 (mass %),
0.5 (mass %) $\leq$ b $\leq$ 6.0 (mass %),
0.1 (mass %) $\leq$ c < 10.0 (mass %),
and
0.1 (mass %) $\leq$ d $\leq$ 3.0 (mass %), respectively.

2. The dielectric ceramic composition according to claim 1, further comprising a bismuth oxide as a minor component, wherein when a mass ratio of the bismuth oxide based on the main component is represented as $eBi_2O_3$, e$\leq$6.0 (mass %).

3. The dielectric ceramic composition according to claim 1 further comprising a cobalt oxide as a minor component, wherein when a mass ratio of the cobalt oxide based on the main component is represented as fCoO, f$\leq$6.0 (mass %).

4. The dielectric ceramic composition according to claim 1, further comprising a manganese oxide as a minor component, wherein when a mass ratio of the manganese oxide based on the main component is represented as $gMnO_2$, g$\leq$3.0 (mass %).

5. The dielectric ceramic composition according to claim 1, further comprising an alkaline earth metal oxide as a minor component.

6. The dielectric ceramic composition according to claim 5, further comprising an alkaline earth metal oxide as a minor component, wherein when a mass ratio of the alkaline earth metal oxide based on the main component is represented as hRO, when Ca is used as an alkaline earth metal R, h is more than 0 (mass %) to 1.5 (mass %) or less in terms of CaO, when Ba is used as the alkaline earth metal R, h is more than 0 (mass %) to 3.5 (mass %) or less in terms of BaO, and when Sr is used as the alkaline earth metal R, h is more than 0 (mass %) to 2.5 (mass %) or less in terms of SrO.

7. The dielectric ceramic composition according to claim 1, wherein the glass comprises lithium oxide.

8. The dielectric ceramic composition according to claim 1, wherein a Q value is 1,000 or more.

9. The dielectric ceramic composition according to claim 2, further comprising a cobalt oxide as a minor component, wherein when a mass ratio of the cobalt oxide based on the main component is represented as fCoO, f$\leq$6.0 (mass %).

10. The dielectric ceramic composition according to claim 2, further comprising a manganese oxide as a minor component, wherein when a mass ratio of the manganese oxide based on the main component is represented as $gMnO_2$, g$\leq$3.0 (mass %).

11. The dielectric ceramic composition according to claim 2, further comprising an alkaline earth metal oxide as a minor component.

12. The dielectric ceramic composition according to claim 2, wherein the glass comprises lithium oxide.

13. The dielectric ceramic composition according to claim 2, wherein a Q value is 1,000 or more.

14. The dielectric ceramic composition according to claim 11, further comprising an alkaline earth metal oxide as a minor component, wherein when a mass ratio of the alkaline earth metal oxide based on the main component is represented as hRO,
- when Ca is used as an alkaline earth metal R, h is more than 0 (mass %) to 1.5 (mass %) or less in terms of CaO,
- when Ba is used as the alkaline earth metal R, h is more than 0 (mass %) to 3.5 (mass %) or less in terms of BaO, and
- when Sr is used as the alkaline earth metal R, h is more than 0 (mass %) to 2.5 (mass %) or less in terms of SrO.

* * * * *